(12) United States Patent
Mancini et al.

(10) Patent No.: US 11,162,268 B2
(45) Date of Patent: Nov. 2, 2021

(54) FORMWORK HAVING ADJUSTABLE CURVATURE FOR PRODUCING CONCRETE PRODUCTS WITH A CURVED PROFILE

(71) Applicant: SOINTEK S.R.L., Novate Milanese (IT)

(72) Inventors: Michele Mancini, Novate Milanese (IT); Roberto Roberto, Novate Milanese (IT)

(73) Assignee: SOINTEK S.R.L., Novate Milanese (IT)

( * ) Notice: Subject to any disclaimer, the term of this patent is extended or adjusted under 35 U.S.C. 154(b) by 0 days.

(21) Appl. No.: 16/486,309

(22) PCT Filed: Feb. 15, 2018

(86) PCT No.: PCT/IB2018/050917
§ 371 (c)(1),
(2) Date: Aug. 15, 2019

(87) PCT Pub. No.: WO2018/150343
PCT Pub. Date: Aug. 23, 2018

(65) Prior Publication Data
US 2020/0002957 A1 Jan. 2, 2020

(30) Foreign Application Priority Data
Feb. 16, 2017 (IT) .................. 102017000017631

(51) Int. Cl.
*E04G 11/06* (2006.01)
*E21D 11/10* (2006.01)
(Continued)

(52) U.S. Cl.
CPC .......... *E04G 11/065* (2013.01); *E21D 11/102* (2013.01); *F16H 19/04* (2013.01); *F16H 25/20* (2013.01)

(58) Field of Classification Search
CPC .......................... E04G 11/065; E21D 11/102
See application file for complete search history.

(56) References Cited

U.S. PATENT DOCUMENTS

| 1,457,089 | A | * | 5/1923 | Sellman | ............... | E04G 11/065 |
| | | | | | | 249/17 |
| 3,363,874 | A | * | 1/1968 | Dennis | .................. | E04G 11/065 |
| | | | | | | 249/17 |
| 7,048,249 | B2 | * | 5/2006 | Jaruzel | .................. | E04G 11/065 |
| | | | | | | 249/18 |

FOREIGN PATENT DOCUMENTS

| CA | 2497358 A1 | * | 3/2004 | .......... | E04G 11/065 |
| DE | 1902971 A1 | | 8/1970 | | |

(Continued)

OTHER PUBLICATIONS

International Search Report, dated May 3, 2018, from corresponding PCT application No. PCT/IB2018/050917.
(Continued)

*Primary Examiner* — Michael Safavi
(74) *Attorney, Agent, or Firm* — Nixon & Vanderhye

(57) ABSTRACT

Disclosed is a formwork for producing concrete products including at least one supporting beam with an axis of extension, at least one panel bendable around a transverse direction with respect to the axis and at least one adjustment device adapted to connect the panel to the beam and to vary the curvature of the panel between a flat undeformed condition and curved condition, where the outer surface is convex or, if necessary, concave, wherein the adjustment device is connected at least at one intermediate point of the panel and at least at one edge point, positioned at a lateral edge substantially parallel to the direction of curvature, in order to simultaneously move the points to vary the curvature of the outer surface of the panel.

19 Claims, 6 Drawing Sheets

(51) Int. Cl.
    *F16H 19/04*    (2006.01)
    *F16H 25/20*    (2006.01)

(56) References Cited

FOREIGN PATENT DOCUMENTS

| | | | | |
|---|---|---|---|---|
| DE | 3422125 A1 * | 2/1986 | ............ | E04G 11/10 |
| DE | 3841579 A1 | 6/1990 | | |
| DE | 4011907 A1 | 6/1991 | | |
| EP | 1096105 A2 | 5/2001 | | |
| EP | 1884608 A2 * | 2/2008 | .......... | E04G 11/065 |
| EP | 1884608 A2 | 2/2008 | | |
| EP | 2472057 A2 | 7/2012 | | |
| FR | 2612545 A1 * | 9/1988 | ............... | B28B 7/04 |
| FR | 2698648 A1 * | 6/1994 | ............... | E04C 3/08 |
| FR | 2704260 A1 * | 10/1994 | .......... | E04G 11/065 |
| FR | 2826033 A1 * | 12/2002 | .......... | E04G 17/002 |
| FR | 2944541 A1 | 10/2010 | | |
| GB | 2054019 A * | 2/1981 | ............ | E04G 17/14 |
| WO | 2014141083 A2 | 9/2014 | | |
| WO | 2014180841 A2 | 11/2014 | | |

OTHER PUBLICATIONS

Written Opinion, dated May 3, 2018, from corresponding PCT application No. PCT/IB2018/050917.

* cited by examiner

FORMWORK HAVING ADJUSTABLE CURVATURE FOR PRODUCING CONCRETE PRODUCTS WITH A CURVED PROFILE

BACKGROUND OF THE INVENTION

Field of the Invention

The present invention concerns a formwork for producing concrete products and in particular products with a curved profile, for example linings for tunnels or the like.

More in detail, the invention relates to a formwork configured to vary the curvature of at least one surface of said products.

Description of the Related Art

In the construction sector, in particular the construction of infrastructures and buildings, formworks are used to produce concrete products; concrete in fluid state is poured into these formworks to give it the desired shape when set.

These formworks, especially those used to produce large infrastructures, such as tunnels, bridges or the like, generally comprise at least one rigid structural element that supports a containing panel or sheet, called "shutter".

The shutter is the part of the formwork directly in contact with the concrete casting and is therefore destined to give the geometric shape of the surface, or surfaces, of the product in contact with it.

Instead, the structural element has the task of transferring the forces applied by the casting onto the surface to a supporting frame. In formworks for producing curved surfaces, the structural element can also have the task of giving and maintaining the curvature of the panel that forms the surface.

To make tunnels or other similar works, in general a plurality of formworks are placed side by side in a direction transverse to the direction of the tunnel, so that the various panels form a curved and continuous surface that extends for a part or for all of the perimeter of the lateral wall of said tunnel.

According to a known way of producing said formworks, the panels that form the shutter each have a given shape or fixed curvature.

In general, the curvature of the panel, typically a metal sheet, is given by a rigid intermediate element interposed between the structural element and the panel, or directly by said structural element.

Said rigid intermediate element, when provided, can comprise a board, arranged parallel to the structural element, with a curved outer edge on which the inner surface of the panel rests or a plurality of struts, each having a given length according to the curvature that the panel must take.

Formworks produced in this way are described, for example, in EP 1096105 A2, EP 2472057 A2, WO 2014141083 A2 and WO 2014180841 A2.

These known formworks, or at least some of their parts, must therefore be specially constructed according to the specifications of a given work (tunnel) to be constructed, cause an increase both in costs, as they cannot be re-utilized unless for identical tunnels, and in times, as all the formworks must be placed before starting the concrete casting operations.

In the sector, there are also known universal formworks, i.e. configured so as to vary the curvature of the panel to adapt to profiles of tunnels with different specifications.

A known example of a formwork of this kind is illustrated in DE 1902971 A1. In detail, the formwork comprises a supporting beam, connected to which is a panel that can be bent by means of threaded bars. By adjusting the length of the aforesaid threaded bars it is thus possible to give the panel a specific curvature. However, this operation wastes a considerable amount of time, as it is necessary to screw or unscrew each threaded bar until reaching the desired profile. A similar formwork is also illustrated in the document EP 2472057 A2.

The documents DE 4011907 A1 and DE 3841579 A1 instead show formworks in which the curvature of the panel is varied by means of hydraulic pistons or threaded bars operated by electric motors. However, these systems require a considerable increase both in the production costs of the formwork and in maintenance costs. In fact, to obtain a given curvature of the panel, a control system is necessary to manage operation of the various actuators that act on the various points of the panel. Moreover, for these reasons, formworks produced in this way are more liable to faults that can cause stops or delays in the construction of the product resulting in considerable financial losses. Finally, the presence of electric or electronic devices can in some cases increase the risk of accidents in the case of malfunctioning.

EP 1884608 A2 describes a formwork for producing curved surfaces comprising a supporting beam, rigidly connected to two points in the central area of a panel to be bent, and two hinges, connected to the beam and to respective points close to the edges of the panel, adapted to exert a tensile force on said points to bend the panel. However, the constraint between the central part of the panel and the beam forms a limit in reaching reduced radii of curvature, unless elastic struts are used, but these are unable to guarantee the perfect shape of the panel when subjected to the pressure exerted by the concrete, especially in the construction of tunnels or the like.

FR 2944541 A1 describes a system for producing formworks with an adjustable curvature comprising a panel with a front face and a rear face on which there are fixed stiffening ribs, connected to one another by a plurality of jacks adapted to decrease and increase the space between said ribs to increase or decrease the curvature of the front face of the panel.

Therefore, in the sector there is a need to provide a formwork for producing concrete products with a curved profile, in particular, but not exclusively, for linings for tunnels and the like, that overcomes the limits of prior art equipment.

BRIEF SUMMARY OF THE INVENTION

In particular, the object of the present invention is to propose a formwork that can be re-utilized several times to produce products with curved surfaces having different profiles and curvatures.

The object of the present invention is also to provide a formwork that allows operations for adjustment of the profile and the curvature of the panel to be carried out rapidly and practically.

Another object of the present invention is to produce a formwork that allows different curvatures of the panel to be obtained, for example with a constant radius, or with a variable radius, symmetrical or asymmetrical.

Another object of the present invention is to produce a formwork provided with a structurally simple and consequently sturdy and reliable adjustment mechanism.

A further object of the present invention is to provide a formwork that is less expensive with respect to known formworks.

These and other objects are achieved by a formwork that comprises at least one structural supporting beam and at least one panel, connected to the supporting beam, bendable around a direction of curvature. In detail, said direction of curvature is transverse, and preferably perpendicular, to a main axis of extension of the beam.

In the foregoing and hereinafter, the term main axis of extension refers to an axis oriented in the direction of greater dimension of the beam. In particular, said axis extends between the ends of the beam and is substantially parallel to the surface of the panel in the flat or undeformed condition.

The beam according to the invention can have any shape, not necessarily rectilinear, for example partly or completely curved, just as it can have a profile with a section constant or variable in shape and size.

The inner side of the panel is connected to the beam by means of an adjustment device, while the outer side is destined to receive the concrete casting.

According to the invention, said adjustment device is adapted to vary the curvature of said panel between a flat undeformed condition and curved condition, where said outer surface is typically convex.

Moreover, the adjustment device has the task of transferring the force that the concrete casting exerts on the panel to the supporting beam.

According to a first aspect advantageous of the invention, the adjustment device is connected to the panel at least at one intermediate point and at least at one edge point of the panel, and acts simultaneously on said points to vary their position with respect to the beam.

Said edge point is preferably at or close to an outer lateral edge of the panel parallel to the axis of curvature. In general, the edge point is located at a distance from the edge of the lower panel of less than 40 cm and preferably less than 20 cm. Instead, said intermediate point can be any point comprised between said edge point and the centerline of the panel, including this latter.

In the case in which there is only one intermediate point, it is preferably at the centerline of the panel. However, the intermediate points can be more than one, for example two or more.

Hereinafter, the terms intermediate point and edge point refer to a circumscribed area on the panel in the vicinity of an aforesaid point and not necessarily at a specific point.

The movement of at least said edge and intermediate points causes bending of the panel, at least in the section comprised between them. More in detail said edge and intermediate points are moved between a position in which they lie on the same plane, when the panel is not deformed, and a position in which they lie on staggered and parallel planes.

Therefore, the device of the present invention allows the bending operation to be simplified as the movement of the two aforesaid points, and consequently the curvature that derives therefrom, takes place in a simultaneous and coordinated manner and, preferably, in a predefined manner.

According to an aspect of the invention, struts are fitted to the inner side of the panel, extending for a part or for the whole of the length of the panel in a direction parallel to the direction of curvature.

More precisely, the panel is provided with said struts at least at said one edge point and at least at said one intermediate point.

The adjustment device is connectable to said struts so as to distribute the forces applied to the panel, on all or on a part of its length, and avoid bending thereof also in a direction transverse to the desired direction.

According to an aspect of the invention, the adjustment device comprises at least one drive mechanism adapted to generate a simultaneous movement at least of the intermediate point, along a direction transverse to the axis of extension of the beam, and of the edge point, along a direction substantially parallel or with at least one component parallel to said axis of extension.

Starting from an undeformed condition of the panel, when the intermediate point is moved away from the beam and the edge point is moved toward the beam or the centerline of the panel, the outer surface of the panel takes a convex curvature. With movements of the aforesaid points in respective opposite directions, this curvature is instead reduced to zero or, if necessary, reversed.

According to a preferred embodiment, the drive mechanism is therefore configured to exert an outward thrust on said intermediate point simultaneously to a pull toward the centerline on the edge point, or vice versa.

According to a preferred variant of the invention, said mechanism comprises mechanically interconnected elements adapted to cause the simultaneous movement of at least said intermediate point and said edge point. Preferably, said interconnected elements comprise essentially mechanical members, i.e., not electrical or electromechanical.

The device thus produced is more reliable and suitable for prolonged use in environments that are damp, soiled, with debris, etc. The device is also safer to use in environments in which there is the risk of fire, explosion, etc.

According to some preferred embodiments, said mechanism comprises gears, an articulated system or a system that is a combination of the above.

According to an aspect of the invention, the drive mechanism comprises a control member to which a force or a movement or a torque or a rotation can be applied, in order to cause movement of the intermediate and edge points. According to a possible variant, these forces or movements are preferably, but not necessarily, in a direction substantially transverse or substantially parallel to the axis of extension of the supporting beam.

These forces or movements are transferred from the drive mechanism at least to the intermediate point and to the edge point to move said points and bend the panel. These movements and rotations are if necessary varied in width and transformed where necessary, for example in the case of a rotational movement of the control member that is transformed into a translation of the points of the panel.

Therefore, by acting on a single control member it is possible to cause the simultaneous movement of at least two or more, or if necessary of all, the points of the panel with respect to the beam, bending it. The drive mechanism is therefore capable of giving the desired curvature to a part or to the whole of the surface of the panel, acting on said control member.

According to an aspect of the invention, the adjustment device can comprise a pair of drive mechanisms, each acting on at least one intermediate point of the panel and on an edge point of respective opposite lateral edges. Preferably, said intermediate and edge points are symmetrical with respect to the centerline of the panel.

Said drive mechanisms can be controlled in a coordinated manner, so as to obtain a profile of the panel that has a symmetrical curvature with respect to the centerline, or independently, to obtain a profile that has an asymmetrical and different curvature for the two sides of the panel.

According to another aspect of the invention, the drive mechanism comprises at least one first drive element, connected to the intermediate point, and at least one second drive element, connected to the edge point. Said first and second drive elements are connected to each other by means of a transmission member.

The control member, in general, is connected to one of said drive elements which, being interconnected, allows the action, force or movement applied to the control member to be transferred to several points of the panel.

In a variant of the invention, the first drive element comprises a first slide sliding along a direction substantially perpendicular to the axis of extension of the beam and the second drive element comprises a second slide sliding along a direction substantially parallel to said axis of extension. The aforesaid directions of sliding are therefore substantially perpendicular to each other.

Said slides are mounted on the beam by means of guides, sleeves or the like.

Moreover, the slides are directly or indirectly connected to the panel, more precisely at the intermediate point and at the edge point, in order to cause their movement to vary the curvature of the panel.

Typically, the slides are connected to the struts positioned at the respective intermediate and edge points.

The slide can be connected to the strut by means of a hinge or said two elements can simply rest against each other. Typically, the first slide, which acts in the intermediate point, is simply resting against the strut, while the second slide, which acts in the edge point, is hinged to the respective strut.

In a first embodiment, the transmission member comprises a first and a second rack, associated respectively with the first and with the second slide, and at least one gear wheel or one gear, rotatable on the beam, which engages both the aforesaid racks.

The translations of the two slides are therefore mutually constrained to each other by said gear. In particular, a movement of the first slide toward the inner side of the panel corresponds to a movement of the second slide toward the centerline of the panel, and vice versa.

By applying a direct thrust toward the inner surface of the panel to the first slide, the intermediate point is moved away from the beam while the edge point is moved toward the centerline. The surface of the panel is therefore curved in a convex manner. In this variant the control member is connected to the lower end of the first slide or is a part thereof.

In the variant that comprises two drive mechanisms, these are preferably arranged symmetrically with respect to the centerline of the panel.

By applying a thrust on both the first slides it is possible to obtain a complete curvature of the panel. Said first slides can also be made integral with each other, for example by means of rods or the like, so that by acting on a single thrust point, it is possible to obtain an identical movement of all the slides and therefore a complete and symmetrical curvature of the panel.

According to another variant of the invention, the first and the second rack can be connected by a gear train. In this way, it is possible to introduce a gear ratio between the movement of the first and of the second slide. By replacing some or all of said gears, it is possible to vary the gear ratio in order to obtain different geometries of the profile of the panel, for example a constant radius or a variable radius, according to requirements.

According to another variant of the invention, the adjustment device comprises a drive mechanism provided with a first slide, connected to the panel at the intermediate point, and two second slides, each connected at an edge point.

The mechanism, in this variant, comprises at least one pair of gears, or of gear trains, simultaneously engaged on the rack of the first slide and on the two racks of the two second slides. Also in this case, a movement of the first slide causes equal and opposite movements of the two second slides.

According to another variant of the invention, the transmission member comprises a first bevel gear wheel, integral in rotation with said first slide, and a second bevel gear wheel, which engages the first gear wheel. The first slide is rotatable about an axis coincident with or parallel to the direction of sliding.

The second gear wheel rotates integrally with a threaded bar and both rotate about an axis parallel to the direction of sliding of the second slide. A lead screw that engages the threaded bar is mounted on the second slide. Therefore, the rotation of the threaded bar causes a translation of the second slide along the direction of sliding.

Preferably, the first slide comprises a shaft, the outer surface of which is provided with a profile sliding in the first gear wheel, along its rotation axis.

Said shaft can, for example, have a grooved profile or a polygonal section, for example square, rectangular or hexagonal, in any case not circular, so as to couple with a respective seat in the first bevel gear wheel and constrain said elements to the rotation.

In this variant, the control member is connected to said first slide or is integral therewith. Preferably, the control member comprises a threaded pin that can be screwed into a seat of the beam. Said pin is movable, as a result of its tightening or loosening, along a direction parallel to the direction of sliding of the first slide. Typically the threaded pin is connected to the lower end of the shaft.

By applying a torque or a rotation in one direction to the control member, i.e. the threaded pin, the first slide, i.e. the shaft, is both rotated and thrust toward the inner surface of the panel. Simultaneously, the first gear wheel, rotated by the first slide, rotates the second gear wheel and the threaded bar. This threaded bar, in turn, causes the movement of the lead screw and consequently the translation of the second slide toward the centerline of the panel.

In this way, the intermediate point of the panel is moved away from the beam, while the edge point is moved toward the centerline to obtain a convex curvature of the outer surface of the panel.

With the rotation of the control member in an opposite direction, the convex curvature is reduced or, if necessary, reversed.

According to another variant of the invention, the drive mechanism comprises hinged rods connected to a control element.

In detail, said drive mechanism comprises:
a first rod hinged to the panel at the intermediate point;
a second rod hinged to the panel at the edge point;
a third rod hinged to the supporting beam and, in an intermediate point, to the first rod;

More precisely, said first rod and said second rod are connected to the struts positioned respectively at the intermediate point and at the edge point.

The control member is connected to the second rod and to the third rod and can move along a direction substantially parallel to the axis of extension of the beam.

In an aspect of the invention, the control member comprises a sliding strut or, preferably, a threaded bar that can be screwed into a support connected to the beam.

When said control member is moved toward the centerline of the panel, it causes the movement of the second rod, which in turn exerts a pulling action at the edge point, which is moved toward the centerline of the panel, bending it. Typically, said edge point is moved toward the beam also in a direction substantially transverse to the axis of extension.

According to the geometric heights of the three rods, the third rod can rotate moving the first rod to a greater or lesser extent, which in turn can move the intermediate point of the panel. This movement can take place away from or, if necessary, also toward the beam. The curvature of the panel is, in any case, generated by the relative movement of said intermediate and edge points.

The variation of the geometric heights of the rods and of the hinge points also allows a curvature of the panel of constant or variable radius.

Also according to this variant, the adjustment mechanisms can be activated independently by separate control elements, or in a manner coordinated by a single control element, to obtain a symmetrical curvature of the panel.

BRIEF DESCRIPTION OF THE DRAWINGS

Further characteristics and advantages of the present invention will be more apparent from the description of an example of a preferred, but not exclusive, embodiment of a formwork as illustrated in the accompanying figures, wherein.

DETAILED DESCRIPTION OF THE PREFERRED EMBODIMENTS

Figure 1:
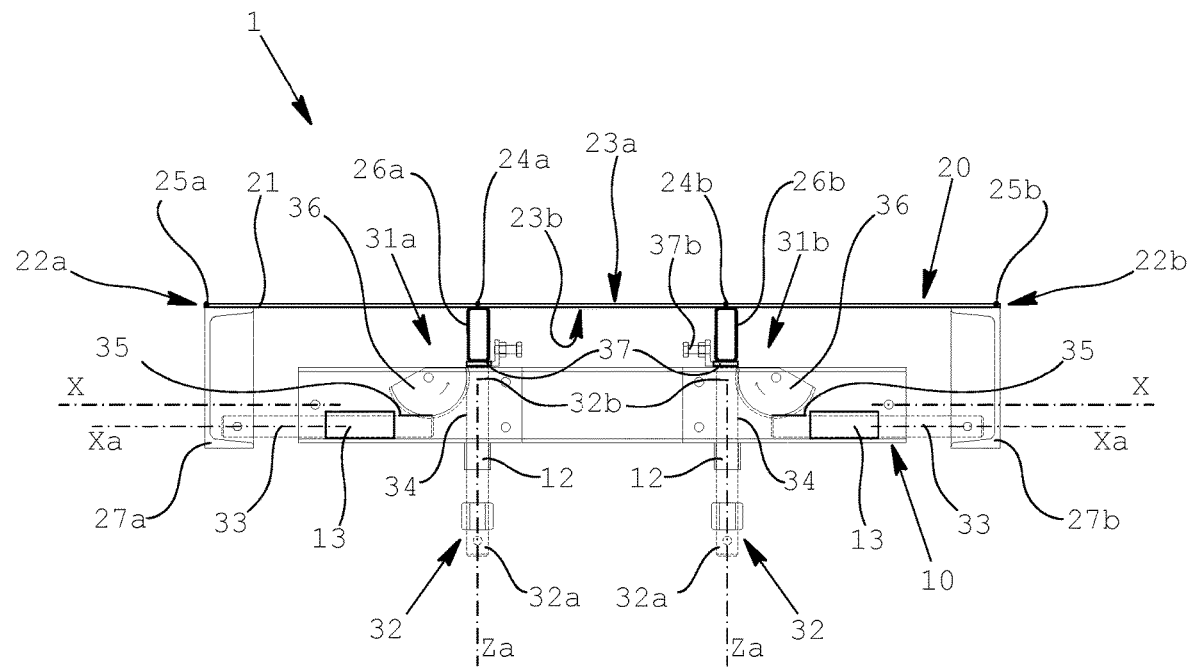
FIG. 1 is a front view of a formwork according to a variant of the invention, with the panel in flat or undeformed condition.

With reference to the accompanying figures, the numeral 1 indicates as a whole a formwork for producing concrete products, or equivalent construction materials, having at least one curved surface.

The formwork 1 comprises at least one supporting beam 10 and at least one panel 20 that defines the "shutter" adapted to give said surface of the product its curved shape.

In the example illustrated, the beam 10 comprises a rectilinear profile that extends along a main axis X. Preferably, said profile has a constant section, for example with back-to-back double UPN profile, or other forms commonly used in mechanical engineering and construction.

In this way, it is possible to use off-the-shelf materials supplied by the majority of suppliers, limiting the production costs.

However, the beam can have any shape, for example partially or entirely curved or with one or more curved sides. In this case, the axis of extension X is positioned in the direction of the greatest dimension of the beam and is parallel to the panel 20, when this latter is flat.

Preferably, the beam 10 is made of metal or other metals suitable to support the stresses transmitted by the concrete casting to the panel. According to the arrangement of the formwork during use, these forces are generated by the hydrostatic thrust of the casting or, in the case of producing tunnel vaults or the like, also by its weight.

The panel 20 comprises a flat sheet having a thickness differing as a function of the material with which it is made. Typically, the panel is made of metal, for example steel, but can also be made of wood or laminated plastic materials. In any case, this thickness is such as to allow the panel to be used without being damaged and at the same time to withstand the pressure exerted by the casting without becoming deformed.

Typically, the panel 20 has a rectangular or square shape, with a front edge 21 and a rear edge, not visible in the figure, parallel to the axis X of the beam 10 and two lateral edges 22a, 22b substantially perpendicular to said axis X.

The dimensions of the panel 20 are variable according to requirements. Generally, the panel has a width, in the direction X, comprised between 0.3 meters and 3 meters, and a length comprised between 0.5 meters and 6 meters.

As a function of the length of the panel 20, the formwork 1 can comprise a single beam 10, for example at the center of the panel in the direction of length, two beams 10, respectively at the front and rear edges of the panel, or further beams 10 arranged between said front and rear edges.

The panel 20 is connected to the beam 10 at an inner surface 23b, the one facing downward in the accompanying figures. The outer surface 23a is instead destined to come into contact with the concrete casting.

As already said previously, the panel 20 is connected to the beam 10 through an adjustment device, indicated as a whole with the number 30, which allows both variation of the curvature of said panel 20 around a transverse direction Y with respect to the axis X of the beam 10, and transfer of the forces applied by the casting to said beam.

In the example illustrated, the panel 20, starting from a flat or undeformed condition visible in FIGS. 1, 3, 5 and 7, can be bent so that the outer surface 23a is convex, as visible in FIGS. 2, 4, 6, 8, 9 and 10.

This curvature can be continuous or not and can involve all or part of said outer surface 23a.

According to an embodiment of the invention, illustrated in FIGS. 1 to 6, the adjustment device 30 comprises a first drive mechanism 31a and a second drive mechanism 31b.

Each drive mechanism comprises at least one first drive element 32, connected to the panel 20 at an intermediate point 24a, 24b and at least one second drive element 33, connected to the panel at an edge point 25a, 25b.

Figure 2:
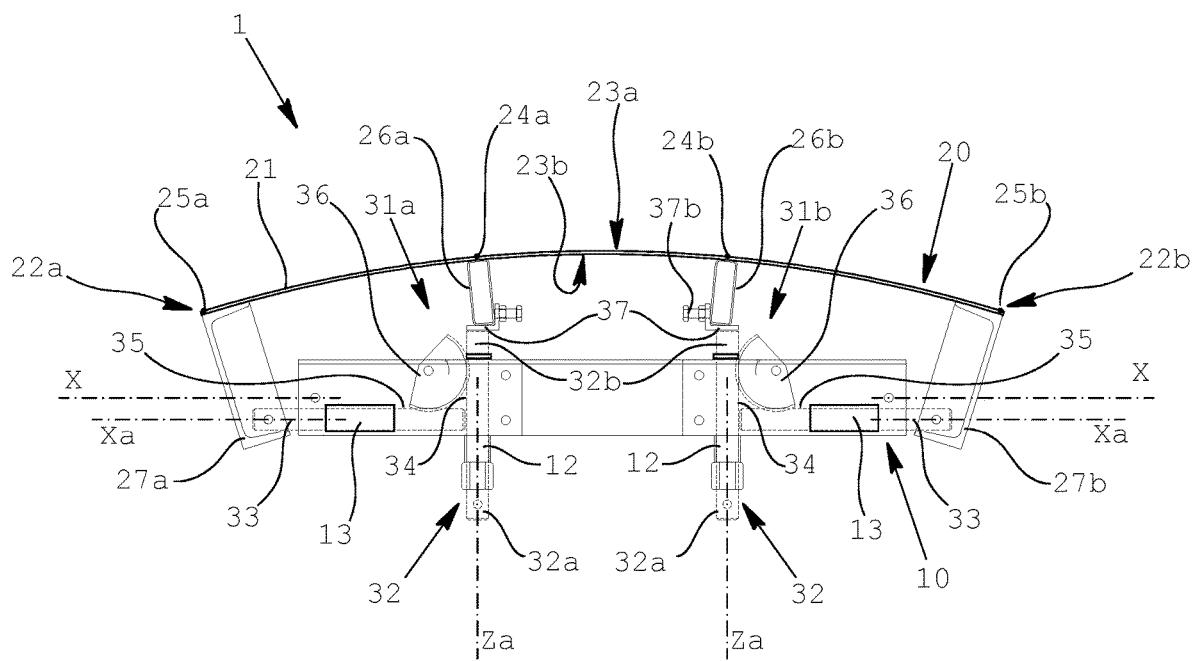
FIG. 2 is a view of the formwork of FIG. 1 with the panel curved.

In a first variant of the invention, illustrated in FIGS. 1 and 2, the first drive element comprises a first slide 32, mounted in a guide 12 on the beam 10. Said guide 12 allows the slide 32 to slide along a direction Za substantially transverse, and preferably perpendicular, to the axis X of the beam 10.

The second drive element comprises a second slide 33 mounted in a respective guide 13 on the beam 10. The guide 13 allows the slide 33 to slide along a direction Xa substantially parallel to the axis X of the beam 10.

The movement of the slides 32, 33 is managed by a transmission member that includes two racks 34, 35, each associated with a slide, adapted to coact with a gear wheel 36 hinged on the beam 10. As the modulus of the rack and of said gear is identical, the two slides 32, 33 are constrained to carry out movements of the same amplitude in the respective directions Za, Xa.

Preferably, the first slide 32 has a lower portion 32a that projects from the lower side of the beam 10 and that can be connected to a control member, not illustrated in the figure, on which or by means of which a thrust is applied to the first slide 32. Said control member can comprise a portion of said slide, in the case in hand the lower end, or can be a separate element that coacts with said first slide.

Instead, the upper end 32b of the slide 32 rests on the intermediate point 24a, 24b of the panel 20.

According to a preferred variant, struts 26a, 26b, 27a, 27b are fitted on the inner surface 23b of the panel 20, preferably extending for the whole of the length of the panel 20 between the front edge and the rear edge. Said struts can comprise profiles with a hollow, open or solid section, preferably made of metal or wood or other sufficiently strong materials.

According to the invention, said struts 26a, 26b, 27a, 27b are fixed to the panel at least at the respective intermediate points 24a, 24b and at the edge points 25a, 25b.

In the variant illustrated, an angular support 37 is fixed at the upper end 32b of the slide 32, adapted to contact and rest against the lower part of the strut 24a, 24b.

A screw 37b is mounted on said angular support 36 and is adjustable to project to a greater or lesser extent toward one side of the strut 26a, 26b in order to avoid any transverse movements of the panel 20.

Instead, the second slide 33 is hinged to the strut 27a, 27b at the edge points 25a, 25b.

When the first slide is translated in the direction Za toward the inner surface 23b of the panel 20, for example by applying a force on the lower end 32b, the intermediate point 24a, 24b is thrust away from the beam 10, upward in FIG. 2.

Simultaneously, the gear wheel 36, which engages both racks 34, 35, is rotated drawing the second slide 33 toward the centerline of the panel 20, which in turn moves the edge point 25a, 25b.

The effect obtained is a curvature of the panel 20 in which the outer surface 23a is convex.

When both the drive mechanisms 31a, 31b are operated in a coordinated manner, the movements of the intermediate and of the edge points are symmetrical with respect to the centerline of the panel, as in the example of FIG. 2.

By applying a force in an opposite direction on the first slides 32, said first and second slides are translated in respective opposite directions reducing the curvature of the panel 20.

In general, the panel is sufficiently elastic to allow a return to the undeformed or flat position when the force F is removed, as indicated in the figures.

For this reason, the drive mechanism 31a, 31b is preferably equipped with blocking means to constrain translation of at least the first slide 32 after reaching the desired curvature.

Figure 3:
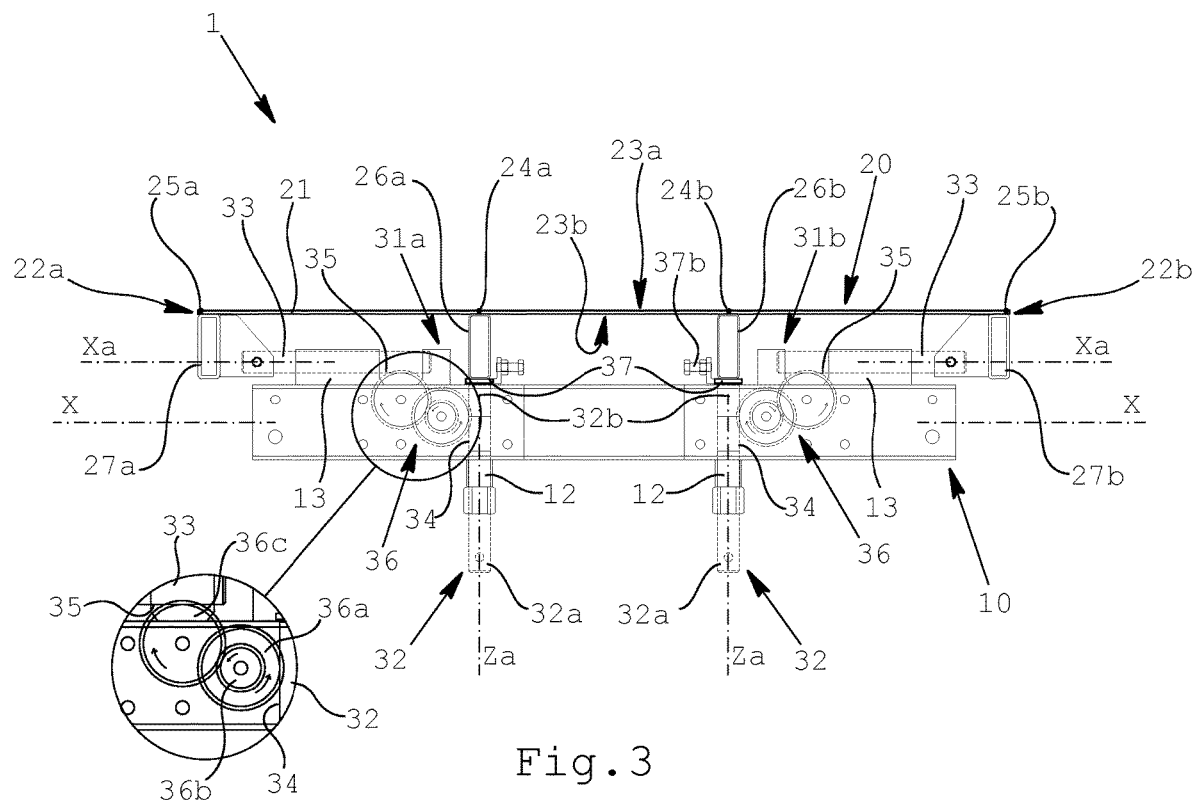
FIG. 3 is a front view of a formwork according to another variant of the invention, with the panel in flat or undeformed condition.
Figure 4:
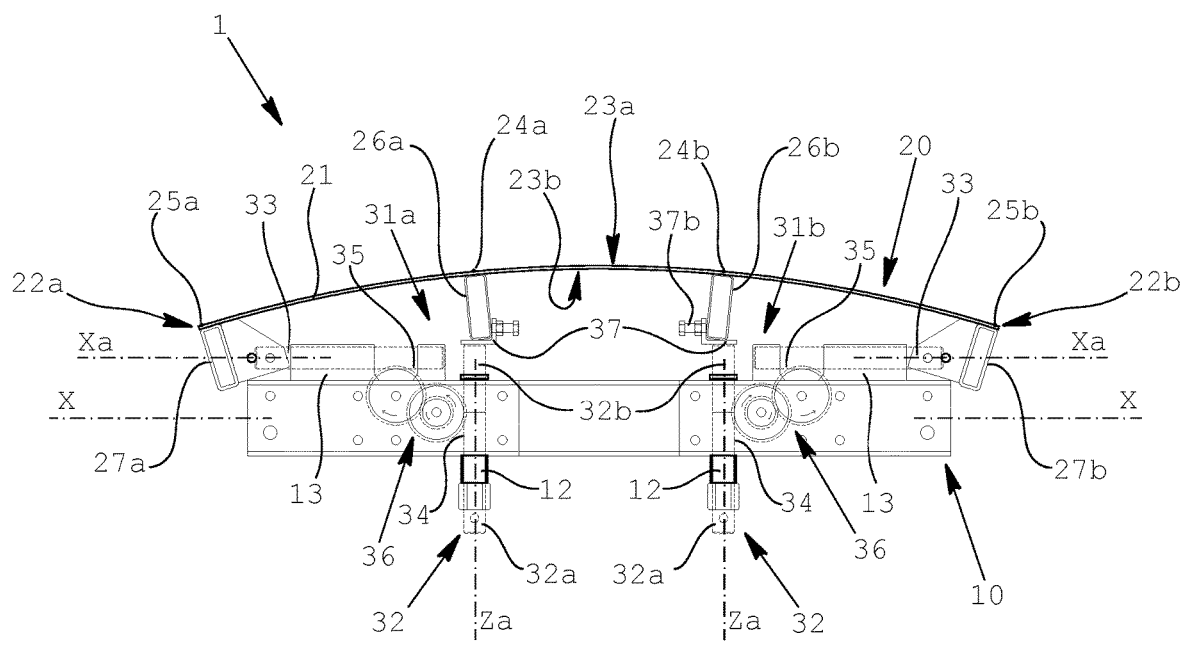
FIG. 4 is a view of the formwork of FIG. 3 with the panel curved.

FIGS. 3 and 4 illustrate a variant of the formwork of FIGS. 1 and 2.

Operation of the drive mechanism is substantially identical to that described above.

In this case, however, the two racks are connected by a gear train 36a, 36b, 36c. A first gear 36a, hinged on the beam 10, is engaged with the rack 34 of the first slide 32. A second gear 36b is mounted coaxial and integral in rotation with said first gear 36a. A third gear 36c is engaged with said second gear 36b and with the rack 35 of the second slide 33.

The transmission ratio between the movement of the first and of the second slide, in this case, can be different to 1. As a function of the number of teeth of the various gears, it is possible to vary said ratio in order to obtain a curvature with a constant radius or, if desired, with a variable radius.

Figure 5:
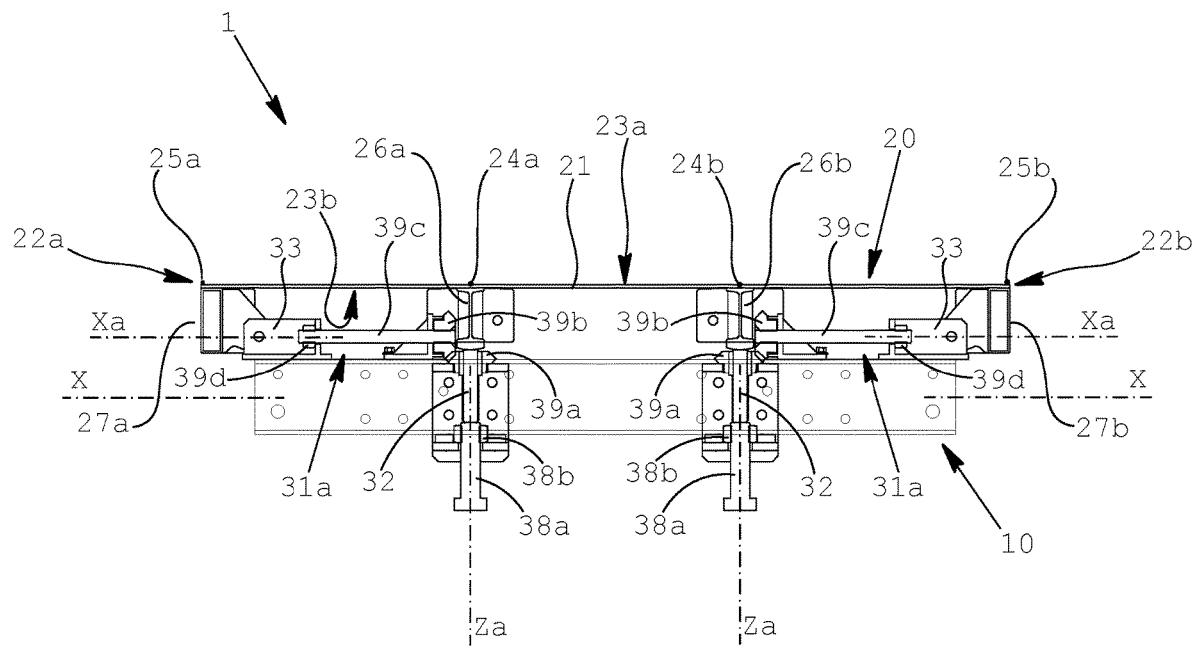
FIG. 5 is a front view of a formwork according to a further variant of the invention, with the panel in flat or undeformed condition.
Figure 6:
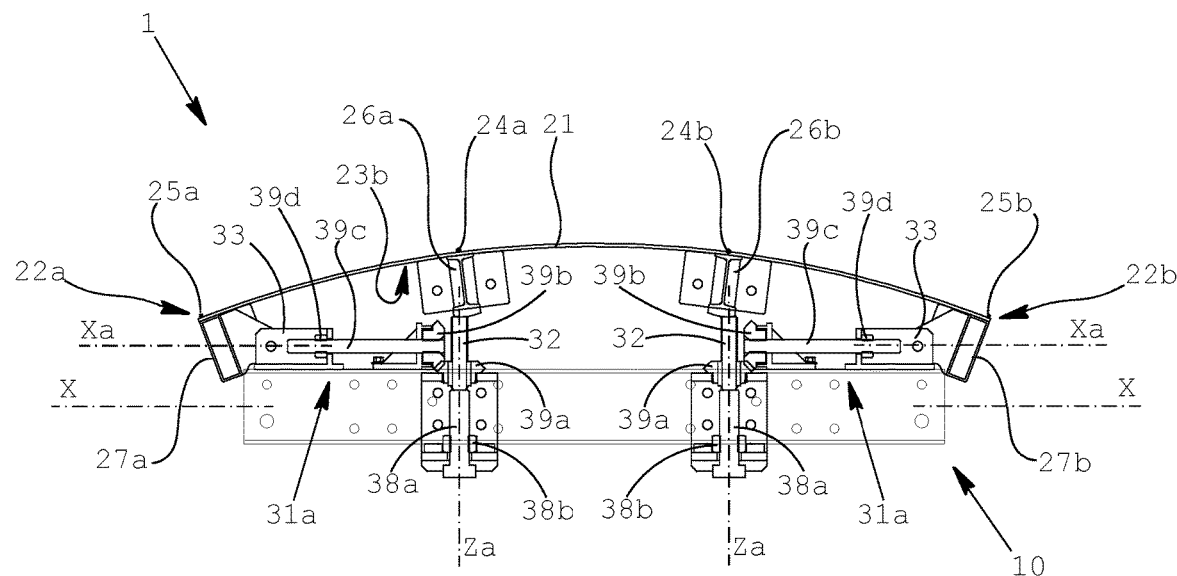
FIG. 6 is a view of the formwork of FIG. 5 with the panel curved.

FIGS. 5 and 6 illustrate another preferred variant of the invention provided with a different transmission member.

In this variant, the drive mechanism 31a, 31b again comprises a first slide 32, sliding along a direction Za substantially transverse, and preferably perpendicular, to the axis X of the beam 10, and a second slide 33, sliding along a direction Xa substantially parallel to the axis X of the beam 10. The slides are connected respectively to the respective intermediate points 24a, 24b and edge points 25a, 25b.

In this variant, the first slide 32 is in the form of a splined shaft, or equivalent shape, rotatable about the axis Za. Said splined shaft rotates integrally with a first bevel gear wheel 39a and slides with respect to it along the axis Za. The first bevel gear wheel 39a is in turn engaged with a second bevel gear wheel 39b that rotates about an axis parallel to the direction of sliding Xa of the second slide 33. The second gear wheel 39b is connected to and rotates integrally with a threaded bar 39c which, in turn, is engaged in a lead screw 39d mounted on the second slide 33.

The lower end of the splined shaft 32 is connected to a threaded pin 38a, screwable into a respective seat 38b obtained on the beam or fitted thereto. Said threaded pin 38a acts as control member. Preferably, said threaded pin 38a rotates integrally with the splined shaft 32.

By rotating the threaded pin 38a in one direction, the splined shaft 32 is thus rotated both about the axis Za and thrust toward the inner surface of the panel. Rotation of the splined shaft is transmitted to the threaded bar 39c by means of the two bevel gear wheels 39a, 39b. This threaded bar 39c, in turn, coacting with the lead screw 39d, controls translation of the second slide 33 toward the centerline of the panel.

Figure 7:
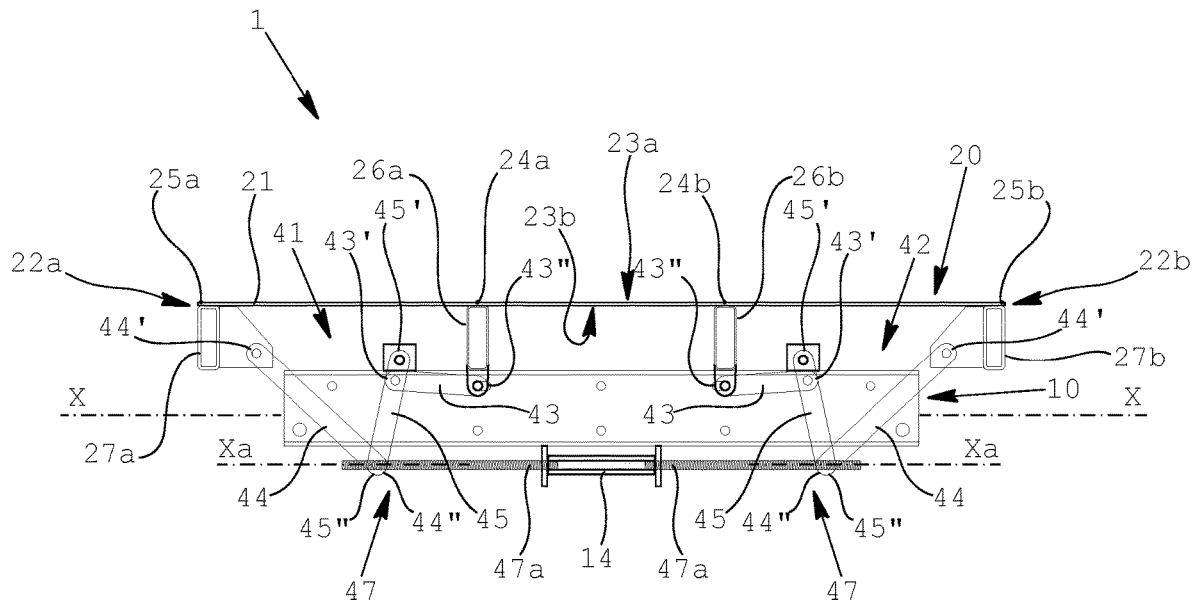
FIG. 7 is a front view of a formwork according to a further variant of the invention, with the panel curved.
Figure 8:
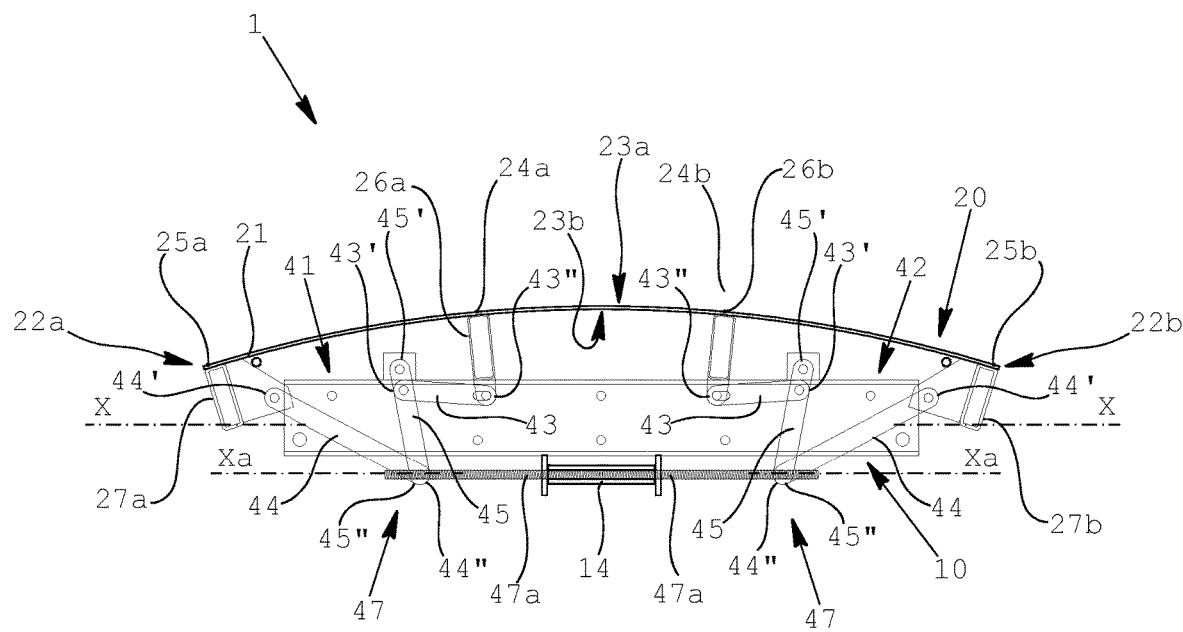
FIG. 8 is a front view of a formwork according to a further variant of the invention, with the panel curved.

FIGS. 7 to 8 illustrate another variant of the formwork according to the invention.

In this variant, the drive mechanism 41, 42 comprises a first rod 43 hinged at one end 43' to the strut 26a, 26b and a second rod 44 hinged at one end 44' to the strut 27a, 27b. A third rod 45 is hinged at one end 45' to the beam 10 and at the opposite end 45" to the other end 44" of the second rod 44. Said third rod 45, in an intermediate point, is hinged to the end 43" of the first rod 43.

The ends 44" and 45" of the second rod and of the third rod are connected to a control member 47 comprising a threaded bar 47a screwable into a threaded sleeve 14 mounted rotatable on the beam 10.

Rotation of the sleeve 14 about an axis Xa, parallel to the axis X of the beam 10, causes the movement of the threaded bar 47a along said axis away from or toward the centerline of the panel 20.

This movement, in turn, moves the rods 43, 44, 45 varying the position of the intermediate points and of the edge points, bending the panel 20.

In the variant illustrated in FIGS. 7 and 8, the threaded bars 47a of both drive mechanisms 41, 42, are housed in the same sleeve 14. The rotation of said sleeve 14 causes the simultaneous translation of the threaded bars 47a in opposite directions to ensure a symmetrical curvature of the panel 20.

According to another variant, not illustrated, the control member can comprise a threaded block connected to the ends 44" and 45" of the second rod and of the third rod. The threaded bar 47a is instead housed in a support with the possibility of rotating about the axis Xa. According to this variant, rotation of the threaded bar 47a causes the movement of the threaded block, hence of the second rod 44 and of the third rod 45 and, consequently, of the first rod 43.

The movement of the threaded bars 47a can therefore be coordinated or independent, to obtain asymmetrical curvature profiles.

Figure 9:
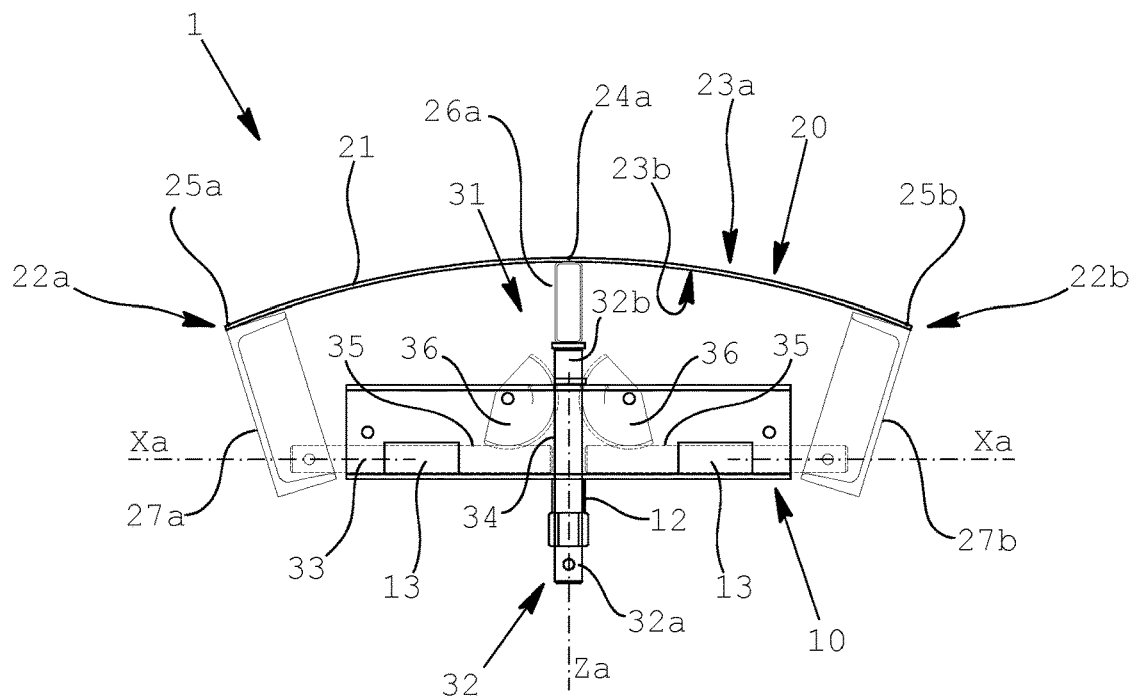
FIG. 9 is a front view of a formwork according to a further variant of the invention, with the panel curved.

FIG. 9 illustrates another variant of the formwork 1 according to the invention. The adjustment device 30 comprises a single drive mechanism 31 connected to a strut 26a, at an intermediate point 24a, and to two struts 27a, 27b at respective edge points 25a, 25b.

In detail, the drive mechanism 31 comprises a first slide 32, mounted in a guide 12 on the beam 10, with the possibility of sliding along a direction Za substantially transverse, and preferably perpendicular, to the axis X of said beam 10. The drive mechanism further comprises a pair of second slides 33, each mounted in a respective guide 13 on the beam 10, and sliding along a direction Xa substantially parallel to the axis X of said beam 10.

The first slide 32 and the second slides 33 are connected respectively to the strut 26a and to the struts 27a, 27b.

Two racks 34, associated with the first slide 32, are connected by means of a pair of gears 36 to respective racks 35 on each second slide 33.

In this variant, the first slide 32 and the two second slides 33 are constrained to carry out movements of the same amplitude in the respective directions Za, Xa, the second slides 33 in opposite directions from each other.

With this variant, simpler with respect to the preceding variants, it is possible to obtain a complete and symmetrical curvature of the panel 20 by moving the first slide 32 in the direction Za.

The same variant can also be implemented equipping the drive mechanism 31 with a pair of gear trains in place of simple gears 36.

Figure 10:
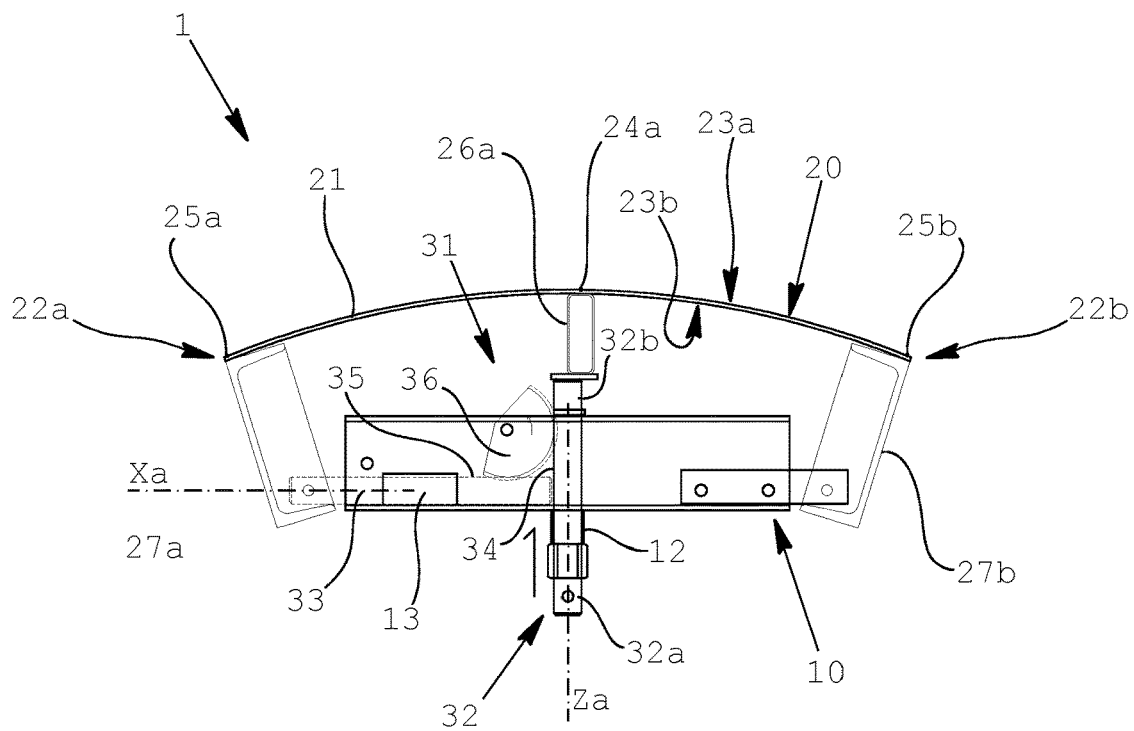
FIG. 10 is a front view of a formwork according to a further variant of the invention, with the panel curved.

FIG. 10 illustrates a further simplified variant of the formwork 1 according to the present invention. In this variant the adjustment mechanism comprises a drive mechanism 31 connected to a strut 26a, at an intermediate point 24a, and more precisely at the centerline of the panel 20, and to a strut 27a at the edge point 25a.

The strut 27b, on the opposite edge point 25b, is instead hinged to the beam 10.

The drive mechanism 31 is substantially identical to that of the variant illustrated in FIGS. 1 and 2.

The first slide 32 and the second slide 33 are connected by a gear 36 or by a gear train, like those described previously.

Unlike the other variants, in this variant only one of the two edge points is connected to the drive mechanism 31, which acts by moving it along a direction Xa substantially parallel to the axis X of the beam 10. The hinge point between the strut 27b and the beam 10 instead remains fixed.

Deformation of the panel 20 therefore takes place by means of the thrust of the first slide 32 in the intermediate point 24a and simultaneously of the pull of the edge point 25a, by the second slide 33, toward the opposite edge of the panel 20.

Figure 11:
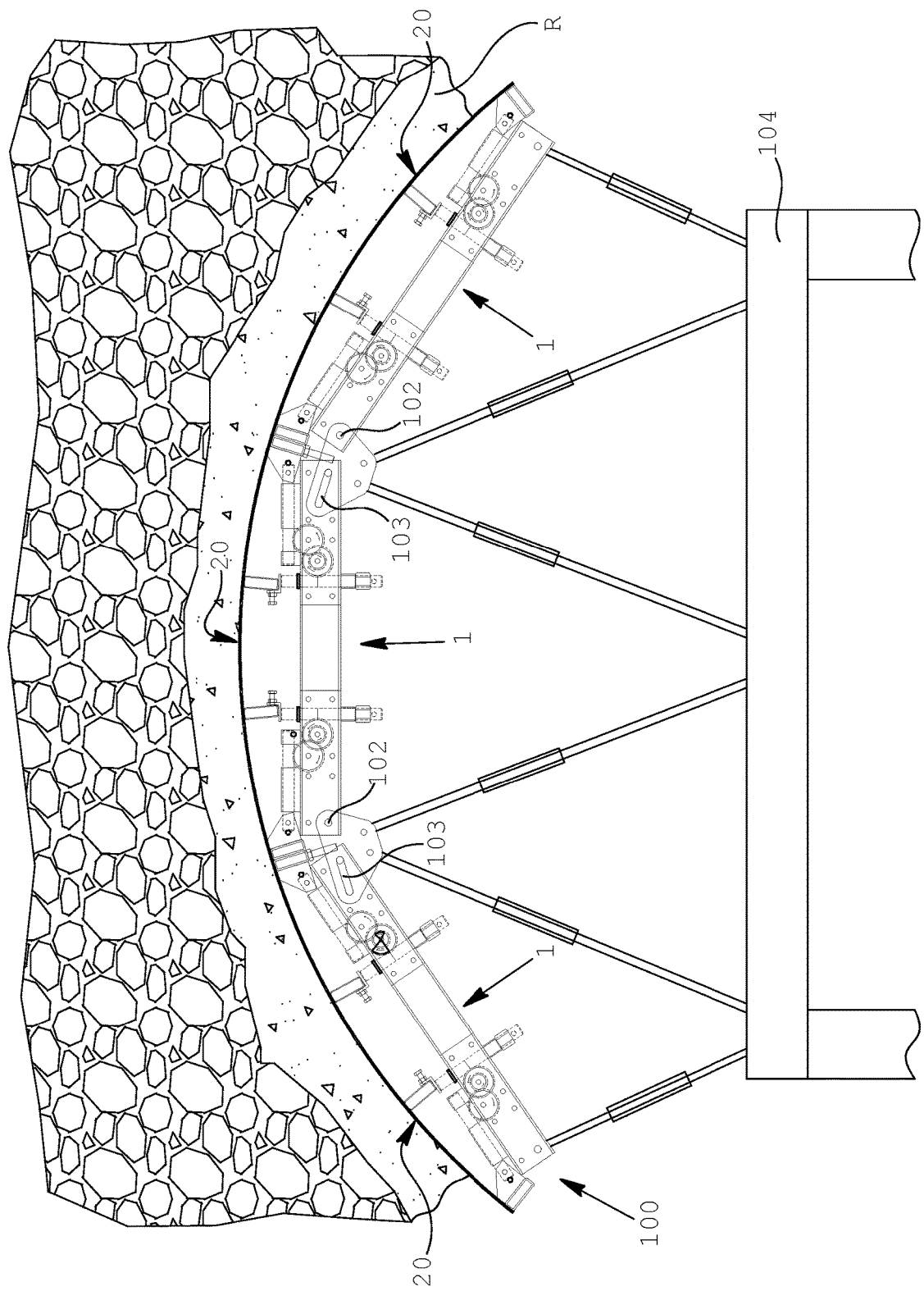
FIG. 11 is a front view of equipment for producing curved products comprising formworks according to the variant of FIG. 3.

FIG. 11 illustrates an example of equipment 100 for producing a product, in this case the lining R of a tunnel G, where this equipment 100 comprises several formworks 1, according to the variant of FIGS. 3 and 4, joined to one another. The equipment is made with formworks according to any one of the variants described.

The connection of two ends of adjacent formworks 1 is preferably implemented by means of plates 101. Said plates 101 are provided with at least one hole 102 and at least one slot 103 to allow the beams to be joined to one another in different angular positions and in any case allow adhesion of the lateral edges of adjacent panels 20, to create a continuous shutter with a uniform curvature.

The formworks 101, during the casting step, are supported by a supporting frame 104 of known type, shown schematically in the figure.

From the description above it can be seen that the formwork produced in accordance with the present invention allows simpler and faster adjustment of the curvature of the panel with respect to that of known manual systems.

Due to the simultaneous exertion of thrust and pulling actions in at least one intermediate point and at least one edge point, it is possible to reduce the manual control actions that an operator requires to carry out to place the formwork for a given work.

With the first two variants, FIGS. 1-4, it is sufficient to move both of the first slides 32 simultaneously, for example by means of a thrust or in another manner, to obtain a continuous and constant curvature of the panel on the whole of the outer surface.

The same operation can be carried out for the variants of FIGS. 9 and 10, moving the single first slide 32 to uniformly bend said outer surface of the panel.

This adjustment of the curvature can be carried out on the ground, before mounting the formworks on the supporting frame 104, or subsequently, before casting.

In the second case, the thrust on the slides 32 can if necessary be applied making use of moving elements provided in the frames and normally used to adapt said frames to the dimensions and to the shape of the tunnel.

Instead, in the variant of FIGS. 5 and 6, it is sufficient to act on the control member, i.e. rotate the threaded pins 38a, until reaching the desired curvature.

Also in the variant of FIGS. 7 and 8, it is possible to rotate the sleeve, to bend the panel until reaching the desired profile.

Advantageously, the drive mechanisms, in all the variants, can be provided with indices associated with the movable parts adapted to indicate the radius of curvature reached by the panel, if this is constant. This makes the use of the formwork even more practical and immediate.

Due to the fact that the formwork of the invention comprises completely mechanical devices, it is sturdy, reliable and inexpensive to produce.

Moreover, due to the drive mechanism, which acts simultaneously and in a coordinated manner on several points of the panel, the bending operation is simpler and faster to perform with respect to prior art formworks.

The invention has been described for illustrative and non-limiting purposes according to some preferred embodiments thereof. Those skilled in the art may find numerous other embodiments and variants, all falling within the scope of protection of the claims below.

The invention claimed is:

1. A formwork (1) for producing concrete products comprising:
   at least one supporting beam (10) with an axis of extension (X);
   at least one panel (20) having an outer surface (23a) destined to come into contact with a concrete casting, said panel (20) being connected on an inner side (23b) to the beam and being bendable around a transverse direction (Y) with respect to the axis of extension (X) of said beam;
   at least one adjustment device (30) adapted to connect the panel (20) to the beam (10) and to vary the curvature of said panel (20) between a flat undeformed condition and curved condition where said outer surface (23a) is convex;
   wherein said adjustment device (30) is connected at least at one intermediate point (24a, 24b) of the panel and at least at one edge point (25a, 25b), positioned at a lateral edge (22a, 22b) substantially parallel to the direction of curvature (Y), said adjustment device (30) providing i) an outward thrust on said at least at one intermediate point (24a, 24b) to provide a first, outward movement of the panel away from the beam, along a direction transverse to the axis of extension of the beam (X), at said at least at one intermediate point (24a, 24b) and ii) simultaneously providing a pull toward a centerline of the panel on said at least at one edge point (25a, 25b) to provide a second, inward movement of said panel, along a direction substantially parallel or with at least one component parallel to the axis of extension (X), at said at least at one edge point (25a, 25b) in order to simultaneously move said at least at one intermediate point (24a, 24b) outward from the beam and said at least at one edge point (25a, 25b) inward toward the centerline of the panel to vary the curvature of the outer surface (23a) of said panel from the flat undeformed condition to the curved condition where said outer surface (23a) is convex.

2. The formwork according to claim 1, wherein the adjustment device (30) comprises at least one drive mechanism (31, 31a, 31b, 41, 42) adapted to generate the first, outward movement of at least the intermediate point (24a, 24b) along the direction transverse to the axis of extension (X) of the beam (10), and to generate the second, inward movement of the edge point (25a, 25b) along the direction substantially parallel to or with the at least one component parallel to said axis of extension.

3. The formwork (1) according to claim 2, wherein said drive mechanism (31, 31a, 31b, 41, 42) comprises mechanically interconnected elements adapted to cause the simultaneous movement of at least said intermediate point (24a, 24b) and said edge point (25a, 25b).

4. The formwork (1) according to claim 2, wherein said drive mechanism (31, 31a, 31b, 41, 42) comprises gears, an articulated system, or both.

5. The formwork (1) according to claim 2, wherein the adjustment device comprises a pair of adjustment mechanisms (31a, 31b, 41, 42), each acting on at least one said intermediate point (24a, 24b) of the panel (20) and on at least one edge point (25a, 25b) of the respective opposite lateral edges (22a, 22b), said intermediate and edge points being symmetrical with respect to the centerline of the panel (20).

6. The formwork (1) according to claim 2, wherein the adjustment mechanism (31a, 31b, 41, 42) is connected to at least one said intermediate point (24a, 24b) and to at least two edge points (25a, 25b), each at the opposite lateral edges (22a, 22b) of the panel.

7. The formwork (1) according to claim 2, wherein said drive mechanism (31, 31a, 31b, 41, 42) comprises a control member (38a, 47) to which a force or a movement, or a torque or rotating movement or both, can be applied, the drive mechanism being configured to transfer said translation or rotation motion of the control member (38a, 47), if necessary modulating or transforming it, at least to the intermediate point (24a, 24b) and to the edge point (25a, 25b).

8. The formwork (1) according to claim 1, wherein the panel (20), on the inner side (23a), is provided with struts (26a, 26b, 27a, 27b) arranged at least at said intermediate point (24a, 24b) and at said edge point (25a, 25b), the adjustment device (30) being connected to said struts.

9. The formwork (1) according to claim 7, wherein said drive mechanism (31a, 31b) comprises:
   at least a first slide (32), mounted sliding along the direction (Za) substantially perpendicular to the direction of extension (X) of the beam (10) and connected to the panel (20) at the intermediate point (24a, 24b);
   at least a second slide (33), sliding along the direction (Xa) substantially parallel to said axis of extension (X) of said beam (10) and connected to the panel (20) at an edge point (25a, 25b);
   said first slide (32) and said second slide (33) being connected by a transmission member.

10. The formwork according to claim 2, wherein the drive mechanism (41, 42) comprises articulated rods (43, 44, 45) connected to a control element (47).

11. The formwork (1) according to claim 3, wherein said drive mechanism (31, 31a, 31b, 41, 42) comprises gears, an articulated system, or both.

12. The formwork (1) according to claim 3, wherein the adjustment device comprises a pair of adjustment mechanisms (31a, 31b, 41, 42), each acting on at least one intermediate point (24a, 24b) of the panel (20) and on at least one edge point (25a, 25b) of the respective opposite lateral edges (22a, 22b), said intermediate and edge points being symmetrical with respect to the centerline of the panel (20).

13. The formwork (1) according to claim 4, wherein the adjustment device comprises a pair of adjustment mechanisms (31a, 31b, 41, 42), each acting on at least one intermediate point (24a, 24b) of the panel (20) and on at least one edge point (25a, 25b) of the respective opposite lateral edges (22a, 22b), said intermediate and edge points being symmetrical with respect to the centerline of the panel (20).

14. The formwork (1) according to claim 3, wherein the adjustment mechanism (31a, 31b, 41, 42) is connected to at least one intermediate point (24a, 24b) and to at least two edge points (25a, 25b), each at the opposite lateral edges (22a, 22b) of the panel.

15. The formwork (1) according to claim 4, wherein the adjustment mechanism (31a, 31b, 41, 42) is connected to at least one intermediate point (24a, 24b) and to at least two edge points (25a, 25b), each at the opposite lateral edges (22a, 22b) of the panel.

16. A formwork (1) for producing concrete products comprising:
   at least one supporting beam (10) with an axis of extension (X);

at least one panel (20) having an outer surface (23*a*) destined to come into contact with a concrete casting, said panel (20) being connected on an inner side (23*b*) to the beam and being bendable around a transverse direction (Y) with respect to the axis of extension (X) of said beam; and at least one adjustment device (30) adapted to connect the panel (20) to the beam (10) and to vary the curvature of said panel (20) between a flat undeformed condition and curved condition where said outer surface (23*a*) is convex, wherein said adjustment device (30) is connected at least at one intermediate point (24*a*, 24*b*) of the panel and at least at one edge point (25*a*, 25*b*), positioned at a lateral edge (22*a*, 22*b*) substantially parallel to the direction of curvature (Y), in order to simultaneously move said points to vary the curvature of the outer surface (23*a*) of said panel, wherein the adjustment device (30) comprises at least one drive mechanism (31, 31*a*, 31*b*, 41, 42) adapted to generate the first, outward movement of at least the intermediate point (24*a*, 24*b*) along the direction transverse to the axis of extension (X) of the beam (10), and to generate the second, inward movement of the edge point (25*a*, 25*b*) along the direction substantially parallel to or with the at least one component parallel to said axis of extension, wherein said drive mechanism (31, 31*a*, 31*b*, 41, 42) comprises a control member (38*a*, 47) to which a force or a movement, or a torque or rotating movement or both, can be applied, the drive mechanism being configured to transfer said translation or rotation motion of the control member (38*a*, 47), if necessary modulating or transforming it, at least to the intermediate point (24*a*, 24*b*) and to the edge point (25*a*, 25*b*), wherein said drive mechanism (31*a*, 31*b*) comprises:

at least a first slide (32), mounted sliding along the direction (Za) substantially perpendicular to the direction of extension (X) of the beam (10) and connected to the panel (20) at the intermediate point (24*a*, 24*b*), at least a second slide (33), sliding along the direction (Xa) substantially parallel to said axis of extension (X) of said beam (10) and connected to the panel (20) at an edge point (25*a*, 25*b*), said first slide (32) and said second slide (33) being connected by a transmission member, and wherein the transmission member comprises a first rack (34) and a second rack (35), associated respectively with the first slide (32) and with the second slide (33), and at least one gear wheel or one gear (36) that engages the aforesaid racks.

17. The formwork (1) according to claim 16, wherein the transmission member comprises a gear train (36*a*, 36*b*, 36*c*) interposed between the first rack (34) and the second rack (35).

18. A formwork (1) for producing concrete products comprising:

at least one supporting beam (10) with an axis of extension (X);

at least one panel (20) having an outer surface (23*a*) destined to come into contact with a concrete casting, said panel (20) being connected on an inner side (23*b*) to the beam and being bendable around a transverse direction (Y) with respect to the axis of extension (X) of said beam; and at least one adjustment device (30) adapted to connect the panel (20) to the beam (10) and to vary the curvature of said panel (20) between a flat undeformed condition and curved condition where said outer surface (23*a*) is convex, wherein said adjustment device (30) is connected at least at one intermediate point (24*a*, 24*b*) of the panel and at least at one edge point (25*a*, 25*b*), positioned at a lateral edge (22*a*, 22*b*) substantially parallel to the direction of curvature (Y), in order to simultaneously move said points to vary the curvature of the outer surface (23*a*) of said panel, wherein the adjustment device (30) comprises at least one drive mechanism (31, 31*a*, 31*b*, 41, 42) adapted to generate a movement of at least the intermediate point (24*a*, 24*b*) along a direction transverse to the axis of extension (X) of the beam (10), and of the edge point (25*a*, 25*b*) along a direction substantially parallel to or with at least one component parallel to said axis of extension, wherein said drive mechanism (31, 31*a*, 31*b*, 41, 42) comprises a control member (38*a*, 47) to which a force or a movement, or a torque or rotating movement or both, can be applied, the drive mechanism being configured to transfer said translation or rotation motion of the control member (38*a*, 47), if necessary modulating or transforming it, at least to the intermediate point (24*a*, 24*b*) and to the edge point (25*a*, 25*b*), wherein said drive mechanism (31*a*, 31*b*) comprises:

at least a first slide (32), mounted sliding along a direction (Za) substantially perpendicular to the direction of extension (X) of the beam (10) and connected to the panel (20) at the intermediate point (24*a*, 24*b*);

at least a second slide (33), sliding along a direction (Xa) substantially parallel to said axis of extension (X) of said beam (10) and connected to the panel (20) at an edge point (25*a*, 25*b*);

said first slide (32) and said second slide (33) being connected by a transmission member, and wherein the first slide (32) is mounted rotatable around the direction of sliding (Za), said transmission member comprising:

a first bevel gear wheel (39*a*) that rotates together with said first slide (32);

a second bevel gear wheel (39*b*) that engages with the first gear wheel (39*a*);

a threaded bar (39*c*) that rotates together with the second gear wheel (39*b*) and can be rotated about an axis parallel to the direction of movement (Xa) of the second slide (33);

a lead screw (39*d*), mounted on the second slide (32), which engages said threaded bar (39*c*).

19. The formwork (1) according to claim 18, wherein said control member (38*a*) is connected to said first slide (32) or is integral therewith.

\* \* \* \* \*